United States Patent
Yu et al.

(10) Patent No.: US 10,430,665 B2
(45) Date of Patent: Oct. 1, 2019

(54) VIDEO COMMUNICATIONS METHODS USING NETWORK PACKET SEGMENTATION AND UNEQUAL PROTECTION PROTOCOLS, AND WIRELESS DEVICES AND VEHICLES THAT UTILIZE SUCH METHODS

(71) Applicant: GM GLOBAL TECHNOLOGY OPERATIONS LLC, Detroit, MI (US)

(72) Inventors: Xin Yu, Troy, MI (US); Fan Bai, Ann Arbor, MI (US); Wende Zhang, Troy, MI (US); John Sergakis, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 156 days.

(21) Appl. No.: 15/698,282

(22) Filed: Sep. 7, 2017

(65) Prior Publication Data
US 2019/0073539 A1 Mar. 7, 2019

(51) Int. Cl.
| | |
|---|---|
| *H04N 19/137* | (2014.01) |
| *G06K 9/00* | (2006.01) |
| *H04L 29/06* | (2006.01) |
| *H04N 19/119* | (2014.01) |
| *H04N 19/172* | (2014.01) |
| *H04N 19/164* | (2014.01) |

(52) U.S. Cl.
CPC ...... *G06K 9/00765* (2013.01); *H04L 65/4069* (2013.01); *H04L 65/602* (2013.01); *H04L 65/607* (2013.01); *H04L 65/80* (2013.01); *H04N 19/119* (2014.11); *H04N 19/137* (2014.11); *H04N 19/164* (2014.11); *H04N 19/172* (2014.11)

(58) Field of Classification Search
CPC ... H04N 19/137; G06K 9/00765; H04L 65/80
See application file for complete search history.

(56) References Cited

U.S. PATENT DOCUMENTS

| | | |
|---|---|---|
| 8,731,577 B2 | 5/2014 | Bai et al. |
| 9,021,049 B2 | 4/2015 | Bai et al. |
| 9,154,923 B2 | 10/2015 | Bai et al. |
| 9,237,197 B2 | 1/2016 | Bai et al. |
| 9,246,970 B2 | 1/2016 | Bai et al. |

(Continued)

*Primary Examiner* — Tsion B Owens
(74) *Attorney, Agent, or Firm* — Lorenz & Kopf, LLP

(57) ABSTRACT

A video communications method includes segmenting an image frame or an image frame portion into first and second source network packet blocks. The first source network packet block includes a first number of source network packets and the second network packet block includes a second number of source network packets. The method further includes encoding the first source network packet block to produce a first encoded network packet block and encoding the second source network packet block to produce a second encoded network packet block. The first encoded network packet block includes a first number of encoded network packets and the second encoded network packet block includes a second number of encoded network packets. Still further, the method includes transmitting the first and second encoded network packet blocks over a wireless network. A wireless device and a vehicle may utilize the video communications method.

17 Claims, 10 Drawing Sheets

(56) References Cited

U.S. PATENT DOCUMENTS

| | | | |
|---|---|---|---|
| 9,258,084 B2 * | 2/2016 | Zhovnirnovsky | H03M 13/616 |
| 9,462,319 B2 | 10/2016 | Bai et al. | |
| 2012/0230390 A1 * | 9/2012 | Akkor | H04N 21/23655 |
| | | | 375/240.02 |
| 2015/0181257 A1 | 6/2015 | Bai et al. | |
| 2015/0227492 A1 | 8/2015 | Bai et al. | |
| 2016/0013812 A1 * | 1/2016 | Summerson | H03M 13/23 |
| | | | 714/795 |
| 2016/0044519 A1 | 2/2016 | Bai et al. | |
| 2016/0316332 A1 | 10/2016 | Bai et al. | |
| 2016/0328197 A1 | 11/2016 | Bai et al. | |
| 2017/0026674 A1 | 1/2017 | Bai et al. | |
| 2017/0034551 A1 | 2/2017 | Bai et al. | |

* cited by examiner

VIDEO COMMUNICATIONS METHODS USING NETWORK PACKET SEGMENTATION AND UNEQUAL PROTECTION PROTOCOLS, AND WIRELESS DEVICES AND VEHICLES THAT UTILIZE SUCH METHODS

INTRODUCTION

The present disclosure generally relates to video communications methods, systems, and operations. More particularly, the present disclosure relates to video communications methods using network packet segmentation and unequal protection protocols, and wireless devices and vehicles that utilize such methods.

The use of wireless devices such as smart phones, tablet computers, image scanners, music players, cameras, drones, and other devices has become increasingly popular. Such wireless devices may include applications that may allow them to communicate with a vehicle, for example by sending images or video to the vehicle. Communication with the vehicle may be accomplished using a vehicle telematics unit. The vehicle telematics unit may establish a short-range wireless communication link with one or more wireless devices. The vehicle telematics unit may act as a server while the wireless devices act as a client to the server. The vehicle telematics unit may include one or more video screens within the vehicle to present the images or video from the wireless devices to an occupant of the vehicle.

In some situations, it is postulated that, due to factors unrelated to the vehicle telematics unit, the reliability of the wireless signal received at the vehicle telematics unit from a wireless device may be hampered. These factors may include wireless interferences, poor signal strength from the wireless device, or signal fading, among others. One method to deal with degraded signal reliability/quality is to increase the absolute amount of data sent from the wireless device to the vehicle for any given image or video, such that even if some of the data is lost in transmission due to one or more of the foregoing factors, enough data may make it to the vehicle to produce an image or video of acceptable quality at the telematics unit. Increasing the absolute amount of data sent may increase the time required to encode the image or video for wireless transmission at the wireless device and subsequently decode the wireless transmission at the telematics unit. This increased encoding/decoding time may introduce time latency, wherein the images or video displayed at the telematics unit exhibit a time delay as compared to when the images or video were captured and/or sent by the wireless device.

In some video communications applications, such as in the context of a wireless device transmitting images or video to a vehicle, it may be desirable to improve signal reliability/quality while at the same time minimizing time latency. Furthermore, other desirable features and characteristics of the present disclosure will become apparent from the subsequent detailed description and the appended claims, taken in conjunction with the accompanying drawings and this introductory section.

SUMMARY

In one exemplary embodiment, a video communications method may include segmenting an image frame or an image frame portion into a first source network packet block and a second source network packet block. The first source network packet block may include a first number of source network packets and the second network packet block may include a second number of source network packets. The method may further include encoding the first source network packet block to produce a first encoded network packet block and encoding the second source network packet block to produce a second encoded network packet block. The first encoded network packet block may include a first number of encoded network packets and the second encoded network packet block may include a second number of encoded network packets. The first number of encoded network packets may be greater than or equal to the first number of source network packets and the second number of encoded network packets may be greater than or equal to the second number of source network packets. Still further, the method may include transmitting the first encoded network packet block and the second encoded network packet block over a wireless network.

In a variation of this embodiment, the first number of encoded network packets may be greater than the first number of source network packets or the second number of encoded network packets may be greater than the second number of source network packets.

In a further variation of this embodiment, the first number of encoded network packets and the second number of encoded network packets may be determined by determining a maximum number of encoded packets ($Q_{max}$) on the basis of an anticipated decoding rate of a receiving device that may be configured to receive the transmitted first and second encoded network packet blocks and determining a set of first probabilities. Each first probability of the set of first probabilities may represent the probability that the first encoded network packet block having $M_1$ encoded network packets will be decodable at the receiving device. Each first probability of the set of first probabilities may represent a different value of $M_1$ less than $Q_{max}$. Numbers of encoded network packets may further be determined by determining a set of second probabilities. Each second probability of the set of second probabilities may represents the probability that the second encoded network packet block having $M_2$ encoded network packets will be decodable at the receiving device. Each second probability of the set of second probabilities may represent a different value of $M_2$ less than $Q_{max}$. Numbers of encoded network packets may further be determined by selecting one first probability of the set of first probabilities and selecting one second probability of the set of second probabilities such that the one selected first probability multiplied by the one selected second probability may have a value greater than or equal to a value of any first probability of the set of first probabilities multiplied by any second probability of the set of second probabilities, and setting the first number of encoded network packets equal to the value $M_1$ represented by the one selected first probability and setting the second number of encoded network packets equal to the value $M_2$ represented by the one selected second probability.

In a further variation of this embodiment, the first number of encoded network packets and the second number of encoded network packets may be determined by (1) determining a maximum number of encoded packets ($Q_{max}$) on the basis of an anticipated decoding rate of a receiving device that may be configured to receive the transmitted first and second encoded network packet blocks, and (2) determining a first probability that the first encoded network packet block having $M_1$ encoded network packets will be decodable at the receiving device. $M_1$ may have a value equal to the first number of source network packets. Numbers of encoded network packets may further be determined by (3) determining a second probability that the second encoded network packet block having $M_2$ encoded network packets will be decodable at the receiving device. $M_2$ may have a value equal to the second number of source network packets. Numbers of encoded network packets may further be determined by (4) determining a third probability that the first encoded network packet block having $M_1+1$ encoded network packets will be decodable at the receiving device and determining a fourth probability that the second encoded network packet block having $M_2+1$ encoded network packets will be decodable at the receiving device, and (5) determining a first incremental gain in probability of the first encoded network packet block on the basis of the third probability divided by the first probability and determining a second incremental gain in probability of the second encoded network packet block on the basis of the fourth probability divided by the second probability. Furthermore, (6) if the first incremental gain in probability is greater than the second incremental gain in probability, numbers of encoded network packets may further be determined by resetting the value of $M_1$ to $M_1+1$, or alternatively, if the second incremental gain in probability is greater than the first incremental gain in probability, by resetting the value of $M_2$ to $M_2+1$. Numbers of encoded network packets may further be determined by repeating steps (2) through (6) until a sum of $M_1$ and $M_2$ equals $Q_{max}$, and setting the first number of encoded network packets equal to the value $M_1$ when the sum of $M_1$ and $M_2$ equals $Q_{max}$ and setting the second number of encoded network packets equal to the value $M_2$ when the sum of $M_1$ and $M_2$ equals $Q_{max}$.

In a further variation of this embodiment, the method may further include, prior to segmenting the image frame or the image frame portion, selecting the image frame or the image frame portion for transmission over the wireless network.

In a further variation of this embodiment, selecting the image frame for transmission over the wireless network may include selecting the image frame from an image frame group that may include at least one image frame of relatively lower importance and at least one image frame of relatively higher importance. Relative importance may be defined on the basis of a relative ability of an image frame to be decoded into an image at a receiving device that is configured to receive the transmitted first and second encoded network packet blocks. Selecting the image frame from the image frame group may include assigning a different unequal protection weighting value to each of the at least one image frame of relatively lower importance and the at least one image frame of relatively higher importance, determining a packet drop rate of encoded network packets transmitted over the wireless network, determining a relative received signal strength (RSSI) at the receiving device, and selecting the image frame from the image frame group based on the unequal protection weighting values, the packet drop rate, and the RSSI.

In a further variation of this embodiment, assigning the different unequal protection weighting values may include assigning a relatively higher unequal protection weighting value to the at least one image frame of relatively higher importance and assigning a relatively lower unequal protection weighting value to the at least one image frame of relatively lower importance.

In a further variation of this embodiment, the image frame group may include an I-frame, a P-frame, and a B-frame. The I-frame may be assigned a relatively higher unequal protection weighting value as compared with the P-frame and the P-frame may be assigned a relatively higher unequal protection weighting value as compared with the B-frame.

In a further variation of this embodiment, selecting the image frame portion for transmission over the wireless network may include selecting the image frame portion from an image frame portion group that may include at least one image frame portion including an object of relatively lower importance and at least one image frame portion including an object of relatively higher importance. Relative importance may be defined on the basis of a relatedness of an object within an image frame portion to the functioning of an electronic application of a receiving device that may be configured to receive the transmitted first and second encoded network packet blocks. Selecting the image frame portion from the image frame portion group may include assigning a different unequal protection weighting value to each of the at least one image frame portion including an object of relatively lower importance and the at least one image frame portion including an object of relatively higher importance, determining a packet drop rate of encoded network packets transmitted over the wireless network, determining a relative received signal strength (RSSI) at the receiving device, and selecting the image frame portion from the image frame portion group based on the unequal protection weighting values, the packet drop rate, and the RSSI.

In a further variation of this embodiment, assigning the different unequal protection weighting values may include assigning a relatively higher unequal protection weighting value to the at least one image frame portion including an object of relatively higher importance and assigning a relatively lower unequal protection weighting value to the at least one image frame portion including an object of relatively lower importance.

In a further variation of this embodiment, the image frame portion group may include an image frame portion including a pedestrian object and an image frame portion including a bicyclist or vehicle object. The image frame portion including the pedestrian object may be assigned a relatively higher unequal protection weighting value as compared with the image frame portion including the bicyclist or vehicle object.

In a further variation of this embodiment, selecting the image frame or the image frame portion for transmission over the wireless network may be performed using a probabilistic adaptive selection protocol that may operate on the basis of an unequal protection weighting value assigned to the image frame or the image frame portion, a packet drop rate of encoded network packets transmitted over the wireless network, and a relative received signal strength (RSSI) at a receiving device that may be configured to receive the transmitted first and second encoded network packet blocks.

In a further variation of this embodiment, transmitting the first encoded network packet block and the second encoded network packet block over the wireless network may be performed such that the first encoded network packet block is transmitted prior to the second encoded network packet block or the second encoded network packet block is transmitted prior to the first encoded network packet block. The method may further include determining an order of transmitting the first and second encoded network packet blocks. Determining the order of transmission may include determining a relative importance of the first encoded network packet block and a relative importance of the second encoded network packet block. Relative importance may be defined on the basis of a relative ability of an encoded network packet block to be decoded into an image at a receiving device that may be configured to receive the transmitted first and second encoded network packet blocks. Determining the order of transmission may further include assigning a different unequal protection weighting value to each of the first encoded network packet block and the second encoded network packet block based on their respective determined relative importance, determining a packet drop rate of encoded network packets transmitted over the wireless network, determining a relative received signal strength (RSSI) at the receiving device, and determining the order of transmission of the first and second encoded network packet blocks based on the unequal protection weighting values, the packet drop rate, and the RSSI.

In a further variation of this embodiment, the first encoded network block may include a wavelet function data block representing the image frame or the image frame portion at a relatively lower resolution and the second encoded network block may include a wavelet function data block representing a high-frequency component. Assigning the different unequal protection weighting values may include assigning a relatively higher unequal protection weighting value to the first encoded network block and assigning a relatively lower unequal protection weighting value to the second encoded network block.

In another exemplary embodiment, a video communications method may include selecting an image frame or an image frame portion for transmission over a wireless network. Selecting the image frame or the image frame portion may include selecting the image frame or the image frame portion from an image frame group or image frame portion group that may include at least one image frame or image frame portion of relatively lower importance and at least one image frame or image frame portion of relatively higher importance. Relative importance with regard to an image frame may be defined on the basis of a relative ability of an image frame to be decoded into an image at a receiving device that may be configured to receive the transmitted image frame or image frame portion and relative importance with regard to an image frame portion may be defined on the basis of a relatedness of an object within an image frame portion to the functioning of an electronic application of the receiving device. Selecting the image frame or the image frame portion from the image frame group or the image frame portion group may include assigning a different unequal protection weighting value to each of the at least one image frame or image frame portion of relatively lower importance and the at least one image frame or image frame portion of relatively higher importance, determining a packet drop rate of encoded network packets transmitted over the wireless network, determining a relative received signal strength (RSSI) at the receiving device, and selecting the image frame or the image frame portion from the image frame group or the image frame portion group based on the unequal protection weighting values, the packet drop rate, and the RSSI.

In a variation of this embodiment, assigning the different unequal protection weighting values may include assigning a relatively higher unequal protection weighting value to the at least one image frame or image frame portion of relatively higher importance and assigning a relatively lower unequal protection weighting value to the at least one image frame or image frame portion of relatively lower importance.

In a further variation of this embodiment, selecting the image frame or the image frame portion for transmission over the wireless network may be performed using a probabilistic adaptive selection protocol that may operate on the basis of the unequal protection weighting values, the packet drop rate, and the RSSI.

In yet another exemplary embodiment, a wireless device may include an electronic processing device and a digital memory device. The digital memory device may include a resident application including computer-readable instructions configured to cause the electronic processing device to segment an image frame or an image frame portion into a first source network packet block and a second source network packet block. The first source network packet block may include a first number of source network packets and the second network packet block may include a second number of source network packets. The computer-readable instructions may further be configured to cause the electronic processing device to encode the first source network packet block to produce a first encoded network packet block and encode the second source network packet block to produce a second encoded network packet block. The first encoded network packet block may include a first number of encoded network packets and the second encoded network packet block may include a second number of encoded network packets. The first number of encoded network packets may be greater than or equal to the first number of source network packets and the second number of encoded network packets may be greater than or equal to the second number of source network packets. Still further, the computer-readable instructions may be configured to cause the electronic processing device to transmit the first encoded network packet block and the second encoded network packet block over a wireless network.

In a variation of this embodiment, the wireless device may be configured as a smart phone, a tablet computer, an image scanner, a music player, a camera, or a drone.

In a further variation of this embodiment, the computer-readable instructions may be further configured to cause the electronic processing device to transmit the first encoded network packet block and the second encoded network packet block over the wireless network to a vehicle. The vehicle may include a telematics unit and a visual display. The telematics unit may be configured to receive the first encoded network packet block and the second encoded network packet block over the wireless network as transmitted by the wireless device. The telematics unit may be further configured to decode the first encoded network packet block and the second encoded network packet block to generate a decoded image. The telematics unit may be further configured to cause the visual display to display the decoded image.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses of the disclosed video communications methods. Furthermore, there is no intention to be bound by any theory presented in the preceding introductory section or the following detailed description.

The present disclosure provides various network communications protocols for the communication of digital images or video between a transmitting device and a receiving device. In the context of the illustrated embodiments of this disclosure, the transmitting device may be embodied as a wireless device, and the receiving device may be embodied as a vehicle. More generally, however, the network communications protocols disclosed herein may be applicable to any transmitting device capable of encoding and transmitting an image or video wirelessly, and any receiving device capable receiving, decoding, and displaying (or otherwise processing) the encoded image or video. Exemplary non-vehicle implementations may include video-enabled security systems, broadcast journalism equipment, and peer-to-peer gamins systems, among many others.

Figure 1:
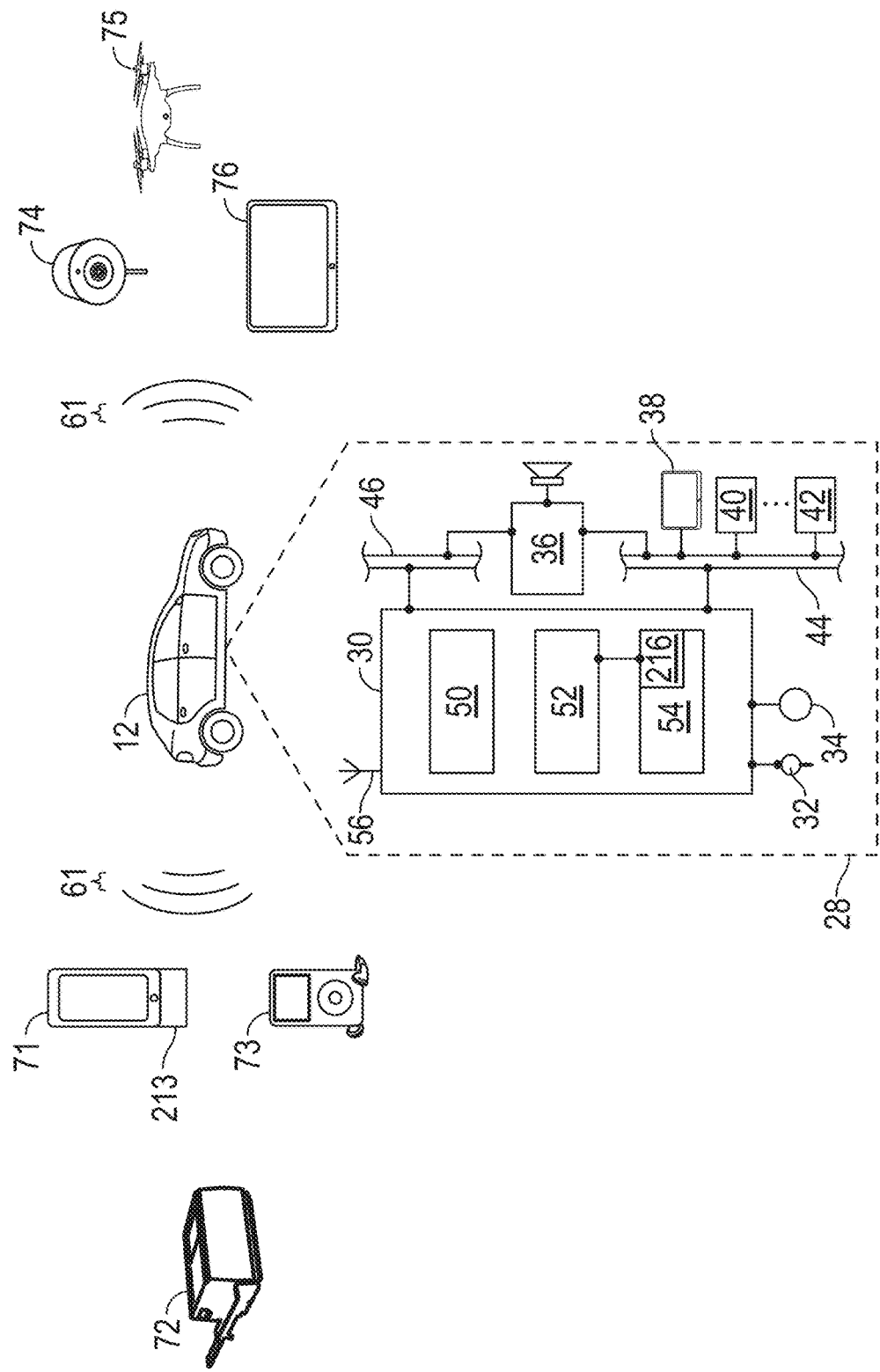
FIG. 1 is a system diagram of a vehicle that is in wireless communication with a one or more of a plurality of wireless devices in accordance with one embodiment of the present disclosure.

Referring now to FIG. 1, illustrated therein, in accordance with one embodiment of the present disclosure, is a system diagram of a vehicle 12, which includes a vehicle electronics system 28, that is in wireless communication (61) with one or more of a plurality of wireless devices 71-76. Vehicle 12 is depicted in the illustrated embodiment as a passenger car, but it should be appreciated that any other vehicles including motorcycles, trucks, sports utility vehicles (SUVs), recreational vehicles (RVs), marine vessels, and aircraft, among others, are also within the scope of the present disclosure. The vehicle electronics system 28 may include a telematics unit 30, a microphone 32, one or more pushbuttons or other control inputs 34, an audio system 36, one or more visual displays 38, and a GPS module 40, as well as one or more vehicle system modules (VSMs) 42. Some of these devices may be connected directly to the telematics unit 30 such as, for example, the microphone 32 and pushbutton(s)/control input(s) 34, whereas others may be indirectly connected using one or more network connections, such as a communications bus 44 or an entertainment bus 46. Suitable network connections within the vehicle electronics system 28 may include a controller area network (CAN), a media oriented system transfer (MOST), a local interconnection network (LIN), or a local area network (LAN), for example, or other appropriate network connections.

In accordance with one embodiment, wireless network communications (61) between the vehicle 12 and the wireless devices 71-76 may be carried out using telematics unit 30. For this purpose, telematics unit 30 may be configured with an antenna 56, and may communicate wirelessly according to one or more wireless protocols, such as any of the IEEE 802.11 protocols, WiMAX, or Bluetooth, among others. When used for packet-switched data communication such as TCP/IP, the telematics unit 30 may be configured with a static IP address or may automatically receive an assigned IP address from another device on the network. Telematics unit 30 may also utilize the antenna 56 for cellular communication according to GSM or CDMA standards, for example, and thus telematics unit 30 may include a standard cellular chipset 50 for voice communications. Furthermore, for purposes of performing data processing and storage functions, telematics unit 30 may include one or more electronic processing devices 52 and one or more digital memory devices 54. As used herein, wireless network communications refer to applications wherein a wireless signal is transmitted directly from a transmitting device to a receiving device, and also to applications wherein the wireless signal is transmitted from the transmitting device to one or more relay devices, and then ultimately to the receiving device.

Electronic processing device 52 may be implemented or realized with a general-purpose processor, a content addressable memory, a digital signal processor, an application specific integrated circuit, a field programmable gate array, any suitable programmable logic device, discrete gate, or transistor logic, discrete hardware components, or any combination thereof designed to perform the functions described herein with respect to telematics unit 30. The electronic processing device 52 may be realized as a microprocessor, a controller, a microcontroller, or a state machine. In some embodiments, electronic processing device 52 may be a multi-thread processor. Moreover, the electronic processing device 52 may be implemented as a combination of computing devices, e.g., a combination of a digital signal processor and a microprocessor, a plurality of microprocessors, one or more microprocessors in conjunction with a digital signal processor core, or any other such configuration. Digital memory device 54 may be a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions and data. The digital memory device 54 may include electronic instructions for image or video signal decoding using the network packet segmentation and unequal protection protocols of the present disclosure, as will be discussed in greater detail below.

Non-limiting examples of wireless devices, which may be capable of wirelessly transmitting a data signal including an image or video, may include a smartphone 71, an image scanner 72, a music player 73, a digital camera 74, a camera-equipped drone 75, or a tablet computer 76, among many others. For purposes of communicating wirelessly with the vehicle 12, any such wireless device(s) 71-76 may include one or more resident applications that may allow them to communicate with the vehicle 12. A resident application may be installed during the wireless device manufacturing process, or it may be provided as an "add-on" application subsequent to purchase. The resident application may include electronic instructions for image or video signal decoding using the network packet segmentation and unequal protection protocols of the present disclosure. The resident application may be stored in a digital memory device of the wireless device, similar to the digital memory device 54, and the protocols of the present disclosure may be performed using an electronic processing device of the wireless device, similar to the electronic processing device 52.

Figure 2:
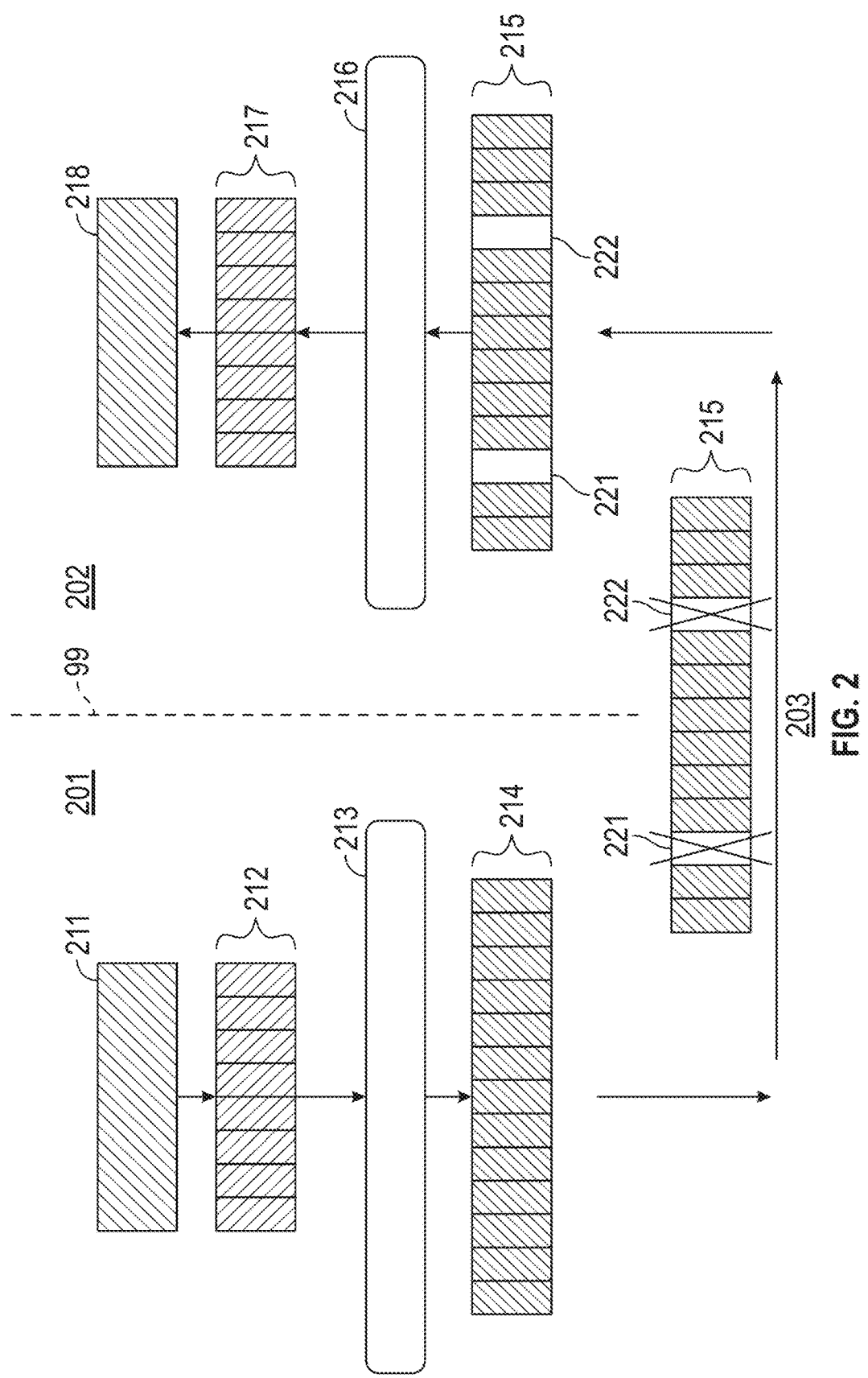
FIG. 2 is a block diagram illustrating a process for digital image encoding and decoding.

As generally used in this disclosure, the term "image encoding" may refer to a process wherein the data constituting a digital image is divided into a plurality of network "packets" for purposes of packet-switched network transmission and encoded with a random linear code, and the term "image decoding" may refer to a process wherein the encoded network packets so-transmitted are decoded, for example using Gaussian elimination techniques, reconstituted into a received digital image. In the context of packet-switched wireless networks, the term "packet" may refer to a formatted unit of data, which may include control information (e.g., source and destination network addresses, error detection codes, and sequencing information) as well as the data related to the digital image. In accordance with the foregoing definitions, FIG. 2 is a diagram illustrating a process of image encoding and decoding, which demonstrates how encoding so as to increase the absolute amount of sent data may function to counteract reliability issues, such as wireless interferences, poor signal strength, or signal fading, while at the same time introducing time latency, as initially described above. In FIG. 2, image sender encoding functions 201 are set forth on the left side of dashed dividing line 99 (and may be performed by the wireless devices 71-76), image receiver decoding functions 202 are set forth on the right side of the dashed dividing line 99 (and may be performed by the telematics unit 30), and encoded image wireless transmission functions 203 cross below the dashed dividing line 99.

As illustrated, the image sender encoding functions 201 may operate on the basis of a digital image frame 211. Image frame 211 may be a stand-alone image frame (as in a photograph) or it may be one in a stream of image frames (as in a video). The image frame 211 may have been captured or otherwise provided by one of the wireless devices 71-76. The image frame 211 may be deconstructed into a plurality (K) of source network packets 212. (All descriptions and illustrations in the present disclosure regarding particular numbers of packets, or particular numbers of packet groupings, are provided for illustrative purposes only, and it will be appreciated that the actual number of packets (or groupings of packets) constituting an image frame may vary widely depending on the particular implementation.) The number K of source network packets 212 may be correlated with the size and definition of the image frame 211.

The number K of source network packets 212 may be processed by a network communications encoder 213 of the resident application of the wireless device (illustrated in FIG. 1 with regard to smartphone wireless device 71) to produce a plurality (M) of encoded network packets 214, wherein M is greater than or equal to K. As noted above, increasing the absolute amount of data sent, that is, increasing the number M of encoded network packets 214, due to redundancy, may increase the statistical probability that sufficient packets will be received by the receiving device (for example, the telematics unit 30) to allow an image of sufficient quality to be decoded and reconstructed. The number of packets, if any, by which M exceeds K, is an encoding design choice that may allow the resident application of the wireless device to balance reliability and latency. For example, if network communications encoder 213 is operated such that M is equal to K, minimal latency would be expected. Yet, due to the possibility of packet loss in transmission, the decoded and reconstructed image may not be of appropriate quality/reliability. Alternatively, if network communications encoder 213 is operated such that M greatly exceeds K, there may be a relatively high probability that sufficient packets will be received to adequately decode and reconstruct the image. The increased data load, however, may result in increased computational time required to decode and reconstruct the image, which may result in increased latency. In this regard, it should be recalled that computational time generally increases quadratically as a function of increasing packet numbers, due to the fact that decoding may be performed using Gaussian elimination techniques, which may require computational time as a function of $M^2$.

In the example of FIG. 2, the number M of encoded network packets 214 exceeds the number K of source network packets 212 by 5 packets (i.e., by about 63%). After encoding at network communications encoder 213, the encoded network packets 214 may be sent via a wireless transmission protocol (transmission functions 203) to the receiver, which may be telematics unit 30. Possibly due to one or more of wireless interferences, poor signal strength, or signal fading, FIG. 2 further illustrates that packets 221 and 222 of the encoded network packets 214 have been lost in transmission (indicated with an "X" marking), and are not received at the receiver. As such, in some instances, a number N of received network packets 215 may be less than the number M of encoded network packets 214 transmitted.

Once received, the number N of received network packets 215 may be decoded at a network communications decoder 216, which may be a part of the vehicle 12, for example the telematics unit 30 thereof (e.g., stored within digital memory device 54 and accessible by electronic processing device 52, as illustrated in FIG. 1). The network communications decoder 216 may operate on the same protocol as the network communications encoder 213, such that the received network packets 215 may be decoded in the same manner by which the encoded network packets 214 were encoded. The decoding operation performed by the network communication decoder 216 may result in R recovered network packets 217, which may in some instances be equal to the number K of source network packets 212. If so, the recovered network packets 217 may be reconstituted into a received image frame 218 that substantially matches the original image frame 211, and may be displayed on the visual display 38 to an occupant of vehicle 12. On the other hand, if an insufficient number N of received network packets 215 exist such that the network communications decoder 216 is only able to produce a number R of recovered network packets 217 that is less than the number K of source network packets 212, then lessened image reliability/quality may be encountered with regard to the received image frame 218.

In the example of FIG. 2, a sufficient number N of received network packets 215 does exist to produce a number R of recovered network packets 217 that is equal to the number K of source network packets 212, but it should be appreciated that the additional computational time required to encode/decode the number (M/N) of packets (214/215), which exceeds the actual number K of source network packets 212, may introduce time latency between when the image frame 211 is captured/provided and when the received image frame 218 is ultimately displayed on the visual display 38 of the vehicle 12. Thus, FIG. 2 illustrates an example of a potential tradeoff between image/video quality/reliability and latency that may be inherent in some wireless network communication encoding/decoding schemes.

Figure 3:
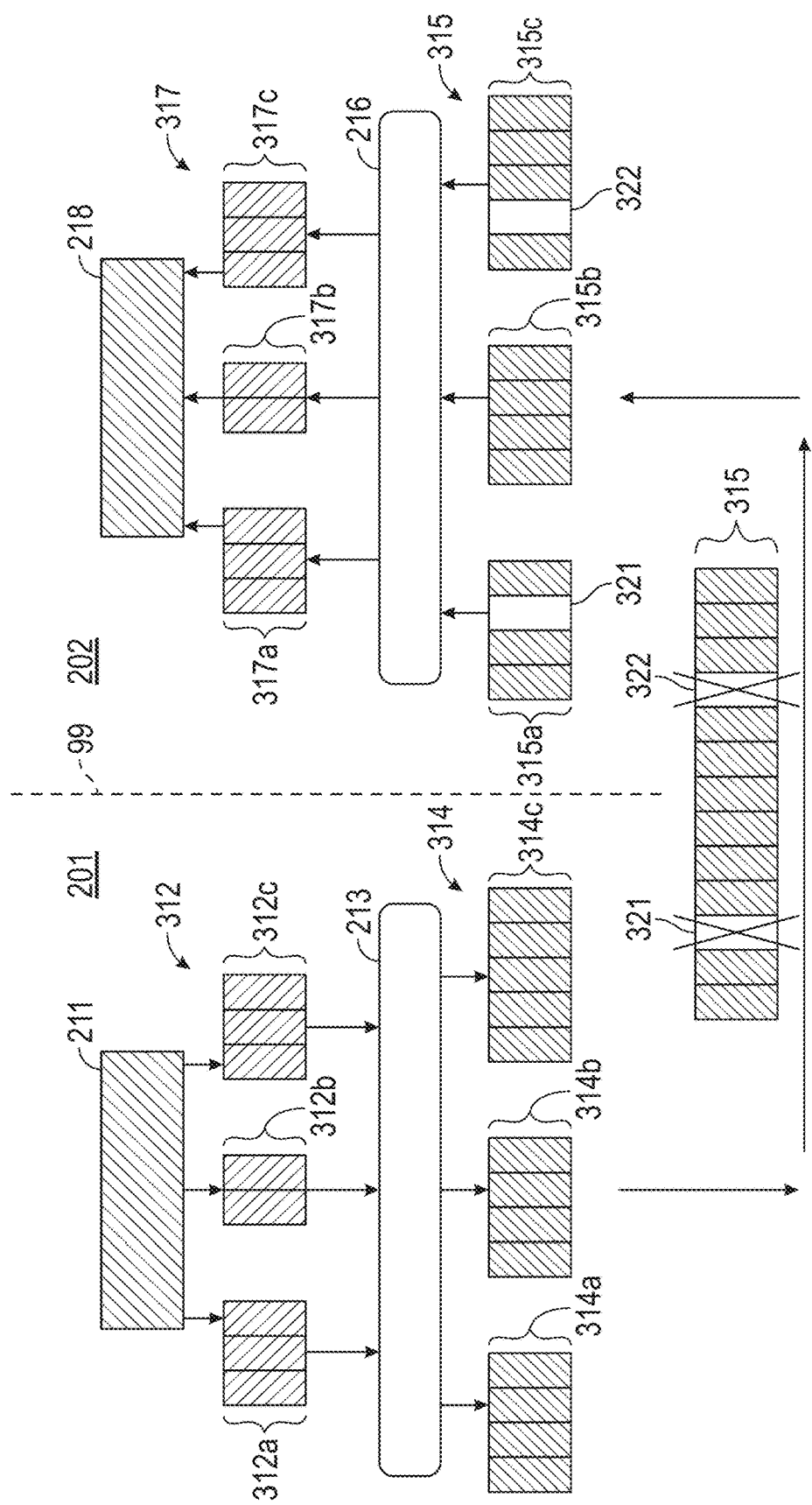
FIG. 3 is a block diagram illustrating a process for digital image encoding and decoding that utilizes a network packet segmentation protocol in accordance with one embodiment of the present disclosure.

As noted above, however, in some instances, it may be desirable to improve signal reliability/quality while at the same time minimizing time latency. As such, embodiments of the present disclosure are generally directed to methods for operating video communications systems that seek to improve image/video quality/reliability while minimizing latency. In some embodiments, these methods may be operated in the context of images/video being sent wirelessly from one or more wireless devices 71-76 to a vehicle 12. With reference now to FIG. 3, illustrated is a block diagram of a process for digital image encoding and decoding that utilizes a source network packet segmentation protocol in accordance with one embodiment of the present disclosure. As used herein, the term "packet segmentation" may refer to a process of grouping the packets that constitute a digital image frame into a number (S) of packet blocks. For example, as illustrated in FIG. 3, original image frame 211, like FIG. 2, has been divided into a number K (specifically, eight) source network packets 312. Yet, in contrast to FIG. 2, the number K of source network packets 312 have been grouped into a number S (as illustrated, three) of source network packet blocks 312a (containing three source network packets), 312b (containing two source network packets), and 312c (containing three source network packets).

Packet segmentation protocols as set forth in the present disclosure take advantage of the advent of multi-thread processors (electronic processing device 52 of the telematics unit 30 may, as noted above, be implemented as a multi-thread processor), which may be able to perform multiple simultaneous processing functions, and the quadratic relationship between the number of packets decoded and the time required to decode such packets, as initially noted above. Particularly, the cumulative time required to decode a number S of segmented blocks, as a quadratic function of the number of packets within each block, may be less than the time required to decode a single block (of all packets), as a quadratic function of the total number N of received network packets 215, as illustrated by the following mathematical relationship:

$$S_1^2 + S_2^2 + S_3^2 < (S_1 + S_2 + S_3)^2$$

Thus, the number S of source network packet blocks 312a, 312b, 312c into which the source network packets 312 are segmented may depend on the processing capabilities of the electronic processing device 52, as well as the particular format and compression scheme of the image frame 211, and may vary for a particular telematics unit 30 or a particular wireless device(s) 71-76.

The source network packet blocks 312a, 312b, 312c may be processed by the network communications encoder 213 of the resident application at the wireless device(s) 71-76 to produce the number S of encoded network packet blocks 314a, 314b, 314c, wherein the total number M of encoded network packets 314 contained within blocks 314a, 314b, 314c may be greater than or equal to the number K of source network packets 312. After encoding at network communications encoder 213, the encoded network packets 314 may be sent via a wireless transmission protocol (transmission functions 203) to the receiver, which may be telematics unit 30. As in FIG. 2, FIG. 3 further illustrates that packets 321 and 322 of the encoded network packets 314 have been lost in transmission (indicated with an "X" marking), and are not received by the receiver, for example the telematics unit 30. Once received, the number N of received network packets 315 may be decoded at the network communications decoder 216 as S groups (315a, 315b, 315c) of received network packets 315. Group 315a has been reduced by one packet, as compared with group 314a, due to the aforementioned loss of packet 321. Moreover, group 315c has been reduced by one packet, as compared with group 314c, due to the loss of packet 322.

The decoding operation performed by the network communication decoder 216 may result in S recovered network packet blocks (317a, 317b, 317c), totaling R recovered network packets 317, which may be equal to the number K of source network packets 312. If so, the recovered network packets 317 may be reconstituted into a received image frame 218 that substantially matches the original image frame 211, and may be displayed on the visual display 38 to an occupant of vehicle 12. On the other hand, if an insufficient number N of received network packets 315 exist such that the network communications decoder 216 is only able to produce a number R of recovered network packets 317 that is less than the number K of source network packets 312, then lessened image reliability/quality may be encountered with regard to the received image frame 218.

As noted above, increasing the absolute amount of data sent, that is, increasing the number M of encoded network packets 314, due to redundancy, may increase the statistical probability that sufficient packets will be received by the receiving device (for example, the telematics unit 30) to allow an image of adequate quality to be decoded and reconstructed. Additionally, although there may be an increased data load, the segmentation of packets into the number S of encoded network packet blocks 314a, 314b, 314c may allow for the blocks to be processed simultaneously in a multi-thread processor, thus minimizing the computational time to decode and reconstruct the image, which may minimize any time latency. In the example of FIG. 3, the number M of encoded network packets 314 exceeds the number K of source network packets 312 by 5 packets (i.e., by about 63%). Yet, due to the simultaneous processing of the encoded network packet blocks 314a, 314b, 314c, the time latency may only increase by the square root of the increase in encoded network packets (i.e., about 8%), which may represent reduction in latency as compared to if the encoded network packets 314 had not been segmented.

The number of encoded network packets $M_1$, $M_2$, $M_3$ in each encoded network packet block 314a, 314b, 314c, as output by the network communications encoder 213, may be determined in several different manners, in accordance with various embodiments of the present disclosure. In one exemplary embodiment, the number of encoded network packets $M_1$, $M_2$, $M_3$ in each encoded network packet block 314a, 314b, 314c may be determined on the basis of a numerical solution that increases the cumulative decoding probabilities of each encoded network packet block 314a, 314b, 314c. In this embodiment, a maximum number Q ($Q_{max}$) of potentially received network packets 315 may be determined on the basis of the expected image frame transmission rate. For example, if a wireless device camera 74 is configured to transmit 20 frames per second, then the number $Q_{max}$ may be set at the number of packets that the electronic processing device 52 is capable of decoding in $1/20^{th}$ of a second, in order to prevent any time latency from occurring. The probability of being able to successfully decode a received network packet block 315a, 315b, 315c of a given number of packets $N_1$, $N_2$, $N_3$ into a respective recovered network packet block 317a, 317b, 317c may also be determined. This probability may be a function of both network conditions and the number of encoded network packets $M_1$, $M_2$, $M_3$ as compared to the number of source network packets $K_1$, $K_2$, $K_3$. For example, the probability of being able to successfully decode a given received network packet block 315a, 315b, 315c may increase in the absence of any network interferences or signal fading. Likewise, an encoded network packet block containing 5 packets, which was encoded from a source network packet block of three packets, may have a greater probability of being decodable into a recovered network packet block of three packets after transmission than if the encoded network packet block contained only 4 packets.

Taking the illustrated example of three received network packet blocks 315a, 315b, 315c, the cumulative decoding probability that each such received network packet block will be able to be successfully decoded into recovered network packet blocks 317a, 317b, 317c may be determined as the product of the probabilities for each respective received network packet block 315a, 315b, 315c. For example, if block 315a has a 95% probability of being decoded, block 315b has a 97% probability of being decoded, and block 315c has a 98% probability of being decoded, then the cumulative decoding probability is 0.95× 0.97×0.98, or about 90.3%. As such, the numerical solution for increasing the cumulative decoding probability may be solved by attempting to maximizing the product of the probabilities (P) for each respective block 315a, 315b, 315c, wherein the probabilities for each respective received network packet block 315a, 315b, 315c may be a function of the number of encoded network packets ($M_i$ for i=1 to S) as compared to the number of source network packets ($K_i$ for i=1 to S), subject to the condition that the total number of packets from each encoded network packet block 314a, 314b, 314c is less than or equal to $Q_{max}$. Network condition may be considered a constant across all encoded network packet blocks 314a, 314b, 314c for a given point in time. This numerical solution may be represented according to the following mathematical formulae:

attempt to maximize $\Pi P_{Mi}(K_i)$ for i=1 to S, subject to $\Sigma M_i < Q_{max}$ for i=1 to S The result of this numerical solution may be a specific value of $M_i$ for each of i=1 to S. These specific values may be used by the network communications encoder 213 in order to produce the number S of encoded network packet blocks 314a, 314b, 314c in a manner that has an increased probability of being decoded after transmission.

Figure 4:
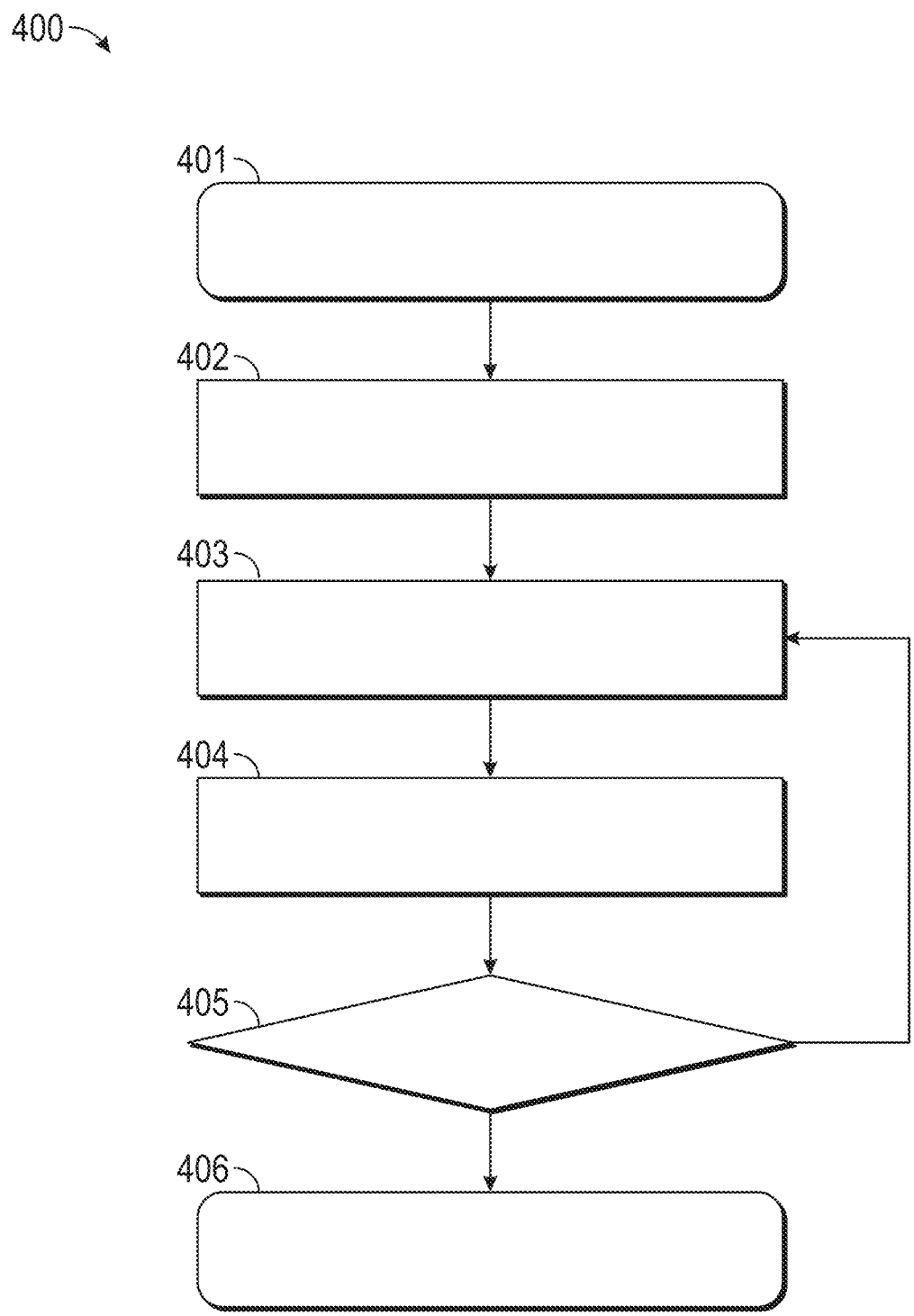
FIG. 4 is an iterative block and flow diagram illustrating a method for determining a number of encoded network packets to be included in an encoded network packet segmented block in accordance with one embodiment of the present disclosure.

In another exemplary embodiment, the number of encoded network packets $M_1$, $M_2$, $M_3$ in each encoded network packet block 314a, 314b, 314c may be determined on the basis of the gain in probability of decoding that each respective encoded network packet block 314a, 314b, 314c may achieve with the incremental addition of one more encoded network packet. In this regard, FIG. 4 presents an iterative block and flow diagram illustrating a method 400 for determining the number of encoded network packets in each encoded network packet block 314a, 314b, 314c. Method 400 begins at step 401, which may include postulating a base encoding case wherein the number of encoded network packets $M_1$, $M_2$, $M_3$ in each encoded network packet block 314a, 314b, 314c matches the number of source network packets $K_1$, $K_2$, $K_3$ in each source network packet block 312a, 312b, 312c, respectively. At step 402 of method 400, an initial decoding probability $P_1$, $P_2$, $P_3$ for each encoded network packet block 314a, 314b, 314c for this base encoding case may be determined. That is, the initial individual decoding probabilities $P_1$, $P_2$, $P_3$ for each encoded network packet block 314a, 314b, 314c may be separately determined. At step 403, each encoded network packet block 314a, 314b, 314c is afforded one additional encoded network packet, and the individual decoding probabilities for each encoded network packet block 314a, 314b, 314c may be separately re-determined on the basis of the added packet for each encoded network packet block 314a, 314b, 314c ($P_{Mi+1}$). The incremental gain in probability that each encoded network packet block 314a, 314b, 314c achieves on the basis of the additional encoded network packet may be determined by dividing the additional packet probability by the base case probability for each block ($P_{Mi}/P_{Mi+1}$). For example, if an encoded network packet block has an 80% probability of being successfully decoded when the number of encoded network packets equals the number of source network packets, and the encoded network packet block has a 92% probability of being successfully decoded when the number of encoded network packets exceeds by one the number of source network packets, then the incremental gain is represented by 92%/80%, or 1.15. Thus, with continued reference to step 403, the encoded network packet block may be selected that has the greatest gain in probability for retaining its additional packet, whereas all other blocks do not retain their additional packet.

At step 404, with the addition of one packet as determined at step 403, the total number of packets M in the encoded network packet blocks 314a, 314b, 314c may be determined as K+1. Then, at step 405, the incremented number of packets M from step 404 may be compared against $Q_{max}$. If $M=Q_{max}$, then the method 400 may end at step 406, with the number of encoded network packets in each encoded network packet block 314a, 314b, 314c having been finally determined at step 403. If $M<Q_{max}$, then the method 400 may iterate back to step 403, wherein each encoded network packet block 314a, 314b, 314c is afforded one additional encoded network packet, the individual decoding probabilities for each encoded network packet block 314a, 314b, 314c may be separately re-determined on the basis of the added packet for each encoded network packet block 314a, 314b, 314c, and the encoded network packet block may be selected that has the greatest gain in probability for retaining its additional packet. This iterative process may be repeated until $M=Q_{max}$, when the number of encoded network packets in each encoded network packet block 314a, 314b, 314c will have been finally determined.

The packet network segmentation protocols discussed heretofore in the present disclosure have been presented in the context of an image frame (e.g., image frame 211). In some digital imaging schemes, an image frame may represent an entirety of the image to be presented. In other digital imaging schemes, however, the image to be presented may be separated into a plurality of image frames, or the image may be compressed such that an image frame does not have enough information to reproduce the entire image. In such, cases, certain frames may be afforded a higher level of importance for transmission based on network conditions, such that an image with increased reliability is received at the vehicle 12. Selecting particular image frames for transmission, selecting particular portions of image frames for transmission, or selecting particular segmented packet blocks of frames for transmission, based on relative frame/ portion/block importance and network conditions, is referred to herein as an "unequal protection" protocol. In exemplary embodiments, an unequal protection may be employed by itself, or in conjunction with network packet segmentation as discussed above, in order to improve video communications reliability/quality while reducing time latency.

Figure 5:
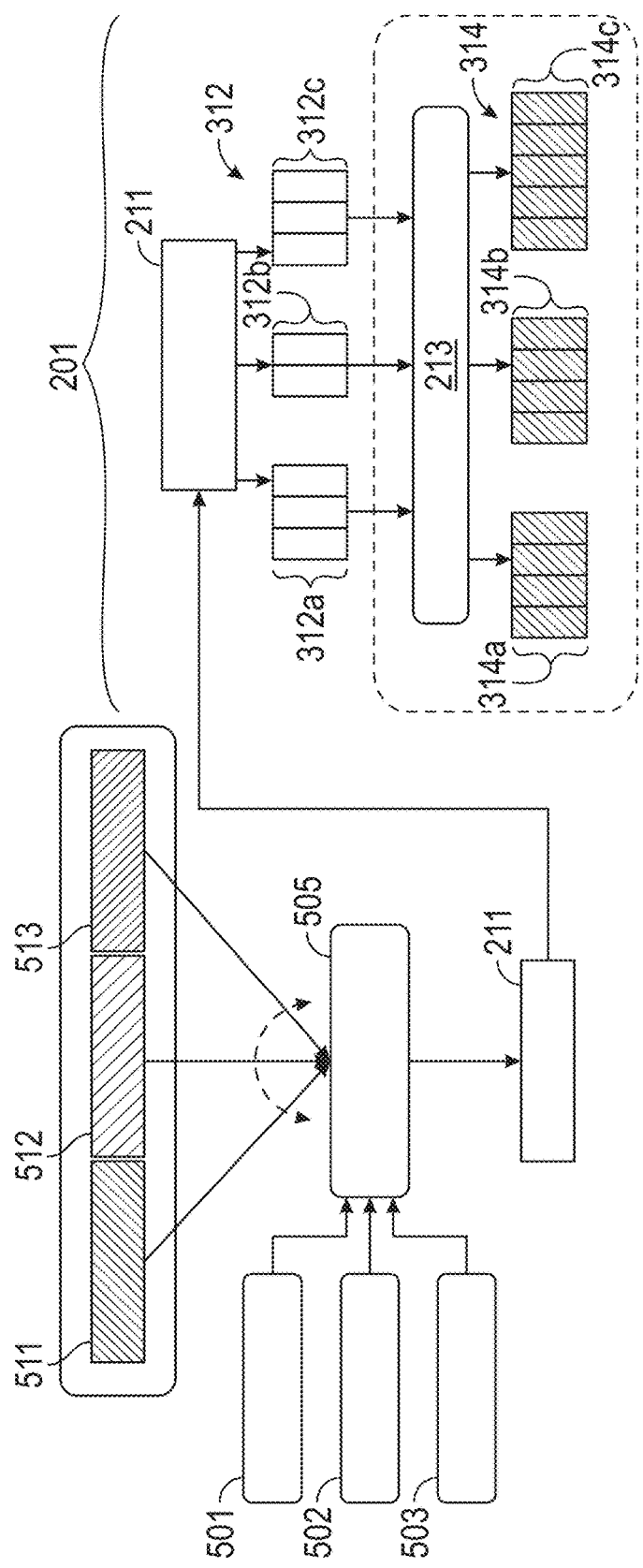
FIG. 5 is an illustration of an unequal protection network communications protocol utilizing I-, P-, and B-frames in accordance with one embodiment of the present disclosure.

In one such embodiment, digital image compression schemes may employ the use of one or more of I-frames, P-frames, and B-frames. For example, I-frames may represent the least compressible type of frame, for a given compression scheme, but do not require other video frames to decode. P-frames may use data from previous frames to decompress and thus may be more compressible than I-frames. Further, B-frames may use both previous and forward frames for data reference in order to achieve an even higher amount of data compression. Reference is now made to FIG. 5, which illustrates an unequal protection network communications protocol utilizing I-, P-, and B-frames in accordance with one embodiment of the present disclosure. In FIG. 5, I-frames are represented at block 511, P-frames are represented at block 512, and B-frames are represented at block 513. Based on observed network conditions, the application resident at the wireless device(s) 71-76 may include an adaptive selector module 505 that selects a particular image frame 211 for transmission on the basis of various factors 501-503. Factor 501 may be an unequal protection "weighting" afforded to each type of frame 511, 512, 513. For example, because I-frames require no additional frames for decompression, I-frames may be afforded the highest unequal protection weighting. Accordingly, P-frames may be afforded a lower weighting than I-frames, and B-frames may be afforded a lower weighting the P-frames. Factor 502 may be an observed packet drop rate (i.e., the ratio of the total number N of received network packets 315 to the total number M of encoded network packets 314 sent). In a network communications system, the observed packet drop rate 502 may be transmitted from the vehicle 12 to the wireless device(s) 71-76 at various time intervals. Factor 503 may be a relative received signal strength (RSSI) at the vehicle 12, which is an indication of potential network performance. Here again, the RSSI may be transmitted from the vehicle 12 to the wireless device(s) 71-76 at various time intervals.

As such, with continued reference to FIG. 5, in an example where I-frames are given the highest unequal protection weighting 501, and where at a given point in time, the packet drop rate 502 is relatively low and the RSSI 503 is relatively high, the adaptive selector module 505 may be configured to select (or may be configured such that it is more probable to select) the I-frame 511 for transmission (i.e., selected frame 211). Conversely, if at the given point in time, the packet drop rate 502 is relatively high and the RSSI is relatively low, the adaptive selector module may be configured to select (or may be configured such that it is more probable to select) the P-frame 512 or the B-frame 513 for transmission (i.e., selected frame 211). The particular selection made by the adaptive selector module 505 (or the probability that a particular selection is made) may vary over time as the packet drop rate may increase or decrease, and as the RSSI may increase or decrease.

Figure 6:
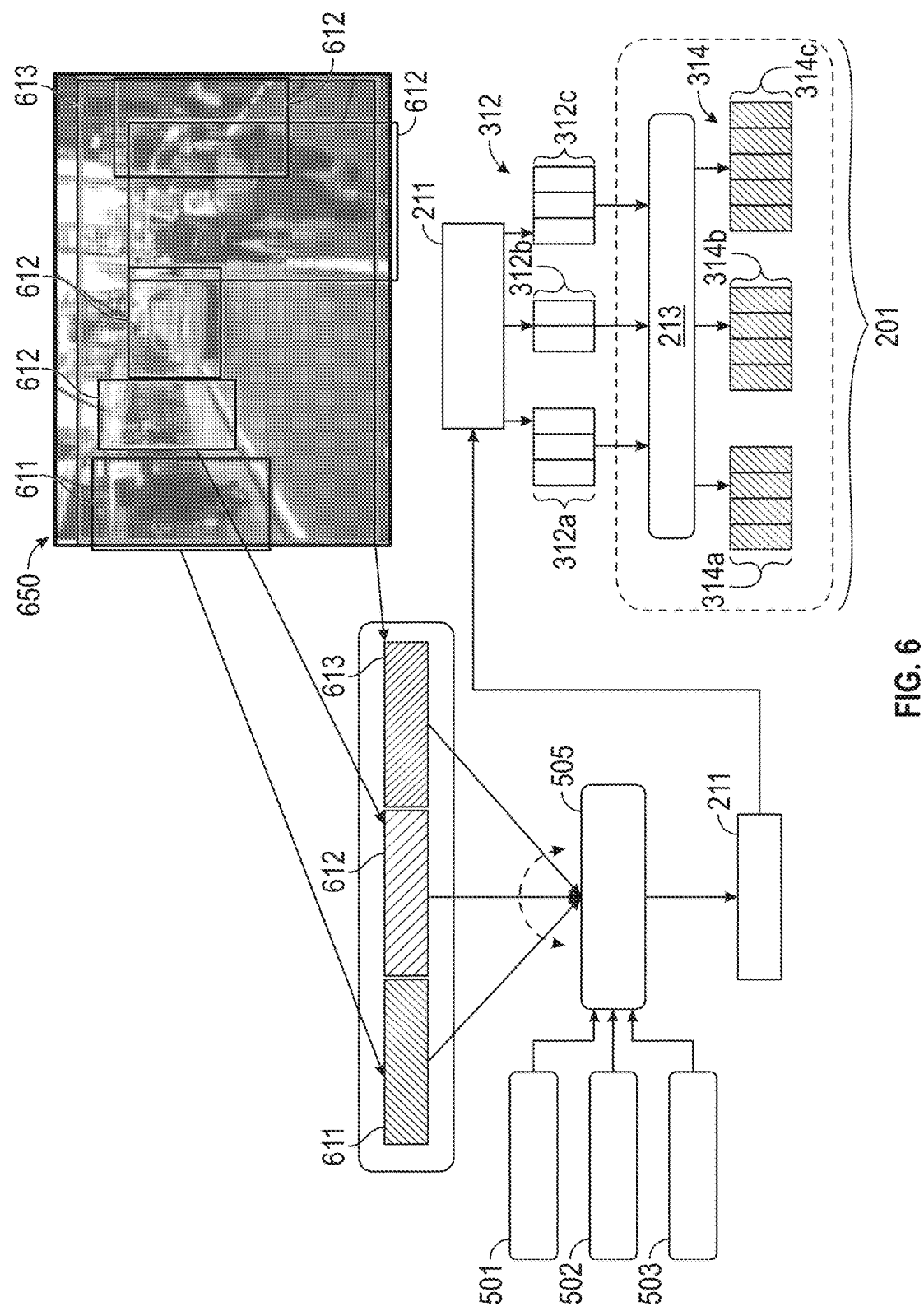
FIG. 6 is an illustration of an unequal protection network communications protocol utilizing object recognition in accordance with one embodiment of the present disclosure.

In another exemplary embodiment, portions of frames may be differentiated on the basis of object recognition. For example, digital image recognition schemes may segment portions of an image (which may be overlapping) into frame portions based on objects recognized in the image. In the example of a vehicle 12, pertinent objects for recognition may include other vehicles, bicyclists, and pedestrians, among others. Such objects may be recognized using various digital image analysis techniques, which may include but are not limited to pattern recognition, corner detection, vertical edge detection, vertical object recognition, and other methods. Reference is now made to FIG. 6, which illustrates an unequal protection network communications protocol utilizing object recognition in accordance with one embodiment of the present disclosure. In FIG. 6, portions of the overall image 650 focusing on objects of relatively high importance are represented at block 611, portions of the overall image 650 focusing on objects of moderate importance are represented at block 612, and general content portions of the overall image 650 (i.e., those not focusing on a particular object) are represented at block 613. As used herein, the relative "importance" of objects should be understood in the context of an application program of the vehicle 12 that utilizes the recognition of such objects to perform some further purpose, and not on any perceived intrinsic importance of an object. For example, in the illustration of FIG. 6, the application program may be a pedestrian detection module, and as such, portions focusing on recognized pedestrians in the image 650 would be considered to have a greater relative importance in the context of that particular application program.

Based on observed network conditions, the application resident at the wireless device(s) 71-76 may utilize adaptive selector module 505 to select a particular portion, represented as frame 211 in FIG. 6, for transmission on the basis of the various factors 501-503. Again, factor 501 may be an unequal protection "weighting" afforded to each type of block 611, 612, 613 based on the relative importance of the object of focus within such portion. For example, again using the example of pedestrian detection module, block 611 representing portions of the image frame that focus on recognized pedestrians may have a relatively high unequal protection weighting. Further, block 612 representing portions that focus on other moving objects, such as bicyclists or other vehicles, may be afforded a lower weighting than the pedestrian-containing portions, while block 613 representing portion that do not focus on any particular object may be afforded a lower weighting than the moving object-containing frames portions. Similarly, factor 502 may be the observed packet drop rate and factor 503 may be the RSSI at the vehicle 12.

As such, with continued reference to FIG. 6, in an example where pedestrian-containing portions of the image frame are given the highest unequal protection weighting 501, and where at a given point in time, the packet drop rate 502 is relatively low and the RSSI 503 is relatively high, the adaptive selector module 505 may be configured to select (or may be configured such that it is more probable to select) the pedestrian-containing portion represented by block 611 for transmission (i.e., selected frame 211). Conversely, if at the given point in time, the packet drop rate 502 is relatively high and the RSSI is relatively low, the adaptive selector module may be configured to select (or may be configured such that it is more probable to select) the moving-object containing portion represented by block 612 or the non-specific portion represented by block 613 for transmission (i.e., selected frame 211). Again, the particular selection made by the adaptive selector module 505 (or the probability that a particular selection is made) may vary over time as the packet drop rate may increase or decrease, and as the RSSI may increase or decrease.

As noted above, in some embodiments, unequal protection protocols may be performed on the basis of segmented source network packet blocks 312a, 312b, 312c of an image frame 211, as opposed to on the basis of the image frame 211 itself (as in the examples of FIGS. 5 and 6, above). In these embodiments, the source network packets 312 may be initially segmented into source network packet blocks 312a, 312b, 312c that have differing levels of importance with regard to the reconstitution of an image (i.e., received image frame 218). For example, some image compression schemes operate on the basis of a wavelet function, which may output a plurality of data blocks. One of these data blocks may represent the actual image, though at a lower resolution, whereas the other blocks are high-frequency components that may be added to the actual (lower resolution) image to reconstruct the image at increasing levels of resolution. The source network packets 312 may be segmented into the number K of source network packet blocks 312a, 312b, 312c on the basis of these wavelet function data blocks.

Figure 7:
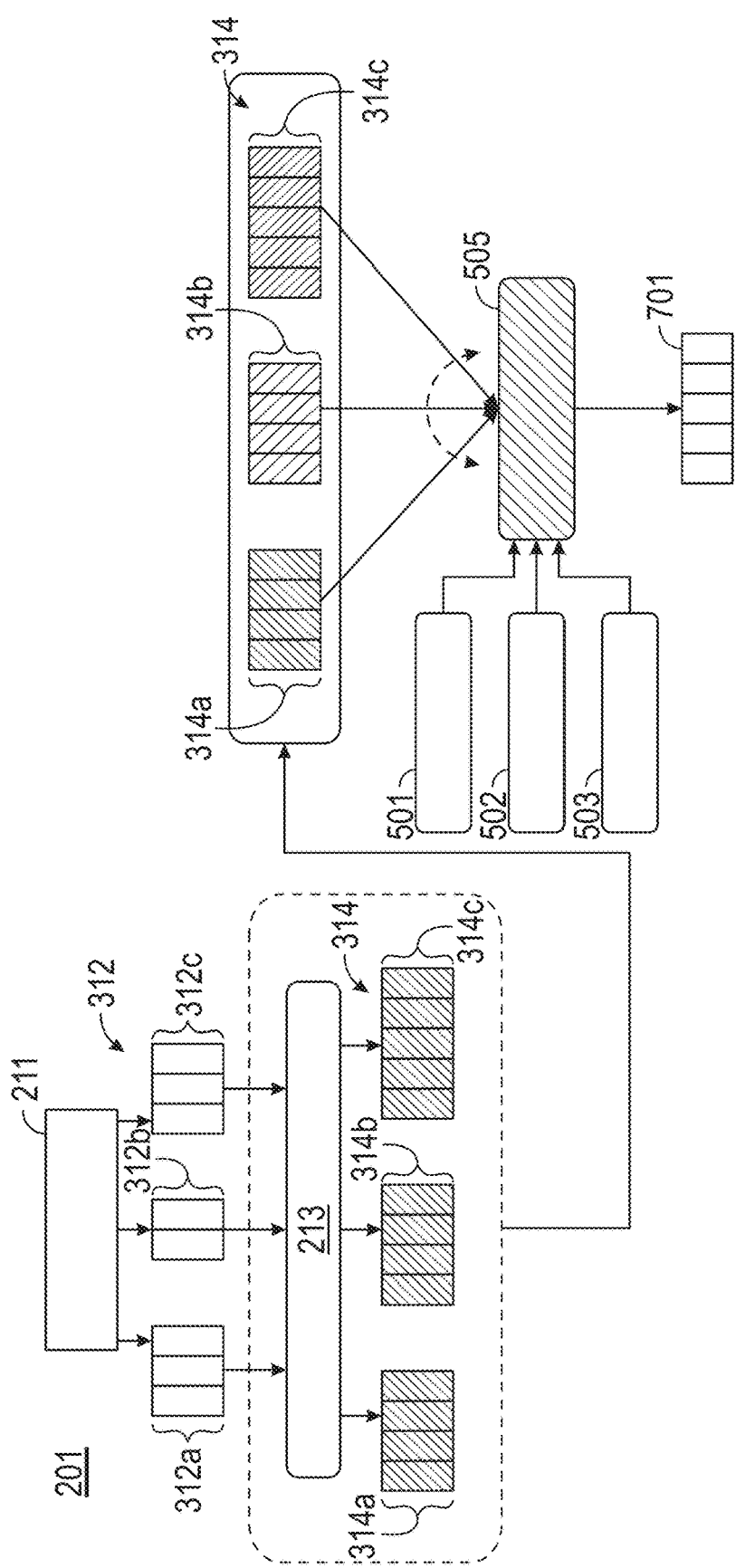
FIG. 7 is an illustration of an unequal protection network communications protocol utilizing source network packet block segmentation in accordance with one embodiment of the present disclosure.

Accordingly, FIG. 7 illustrates an unequal protection network communications protocol utilizing source network packet block segmentation in accordance with one embodiment of the present disclosure. In this embodiment, source network packet block 312a may represent the block including the actual, lower resolution image, source network packet block 312b may represent a high-frequency component for reconstructing the image at an intermediate resolution, and source network packet block 312c may represent a high-frequency component for reconstructing the image at a higher resolution. As initially noted, block 312a may be used, by itself, to reconstruct a lower resolution image, whereas block 312b requires the additional presence of block 312a to reconstruct the intermediate resolution image, and block 312b requires the presence of each of blocks 312a, 312b to reconstruct the higher resolution image. Once encoded, these source network packet blocks 312a, 312b, 312c may become encoded network packet blocks 314a, 314b, 314c, respectively. As such, because encoded network packet block 314a is able to stand on its own, it may be given a higher unequal protection weighting 501, whereas encoded network packet block 314b may be afforded a lesser weighting 501, and encoded network packet block 314c may be afforded an even lower weighting 501. Similarly, factor 502 may be the observed packet drop rate and factor 503 may be the RSSI at the vehicle 12.

As such, with continued reference to FIG. 7, in an example where low-resolution image blocks are given the highest unequal protection weighting 501, and where at a given point in time, the packet drop rate 502 is relatively low and the RSSI 503 is relatively high, the adaptive selector module 505 may be configured to select (or may be configured such that it is more probable to select) the lower-resolution image block 314a for transmission (selected encoded network packet block 701). Conversely, if at the given point in time, the packet drop rate 502 is relatively high and the RSSI is relatively low, the adaptive selector module may be configured to select (or may be configured such that it is more probable to select) the intermediate resolution high-frequency component 314b or the higher resolution high-frequency component 314c for transmission (selected encoded network packet block 701). Again, the particular selection made by the adaptive selector module 505 (or the probability that a particular selection is made) may vary over time as the packet drop rate may increase or decrease, and as the RSSI may increase or decrease.

Figure 8:
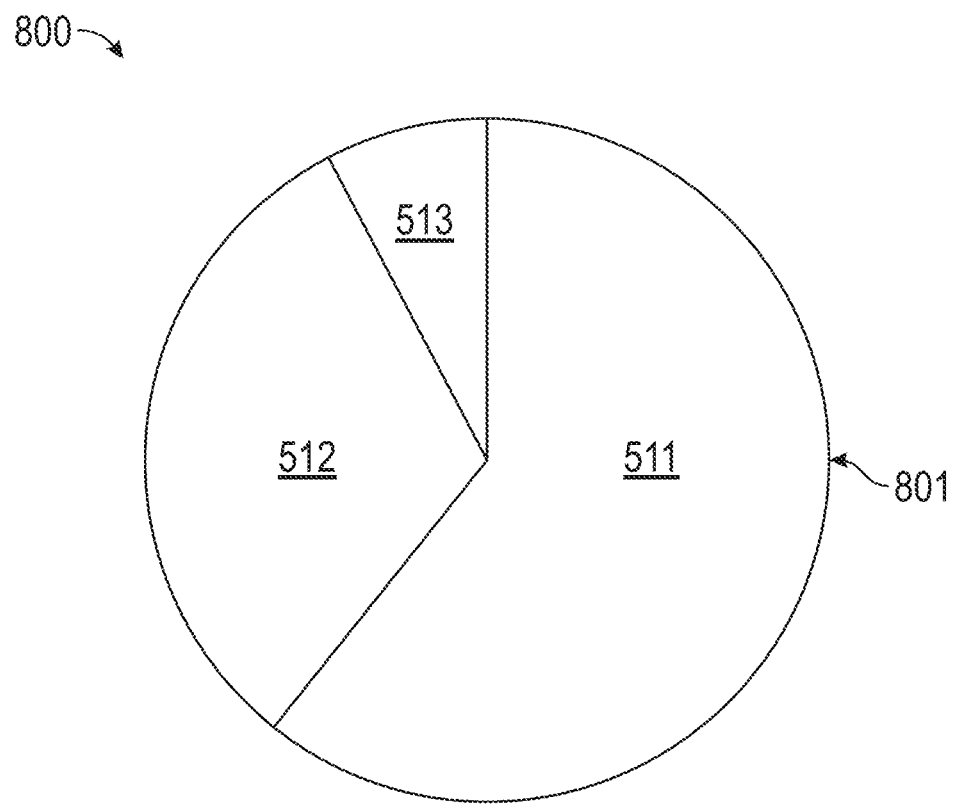
FIG. 8 is an illustration of a circle chart representing the operation of an adaptive selector module in accordance with one embodiment of the present disclosure.
Figure 9:
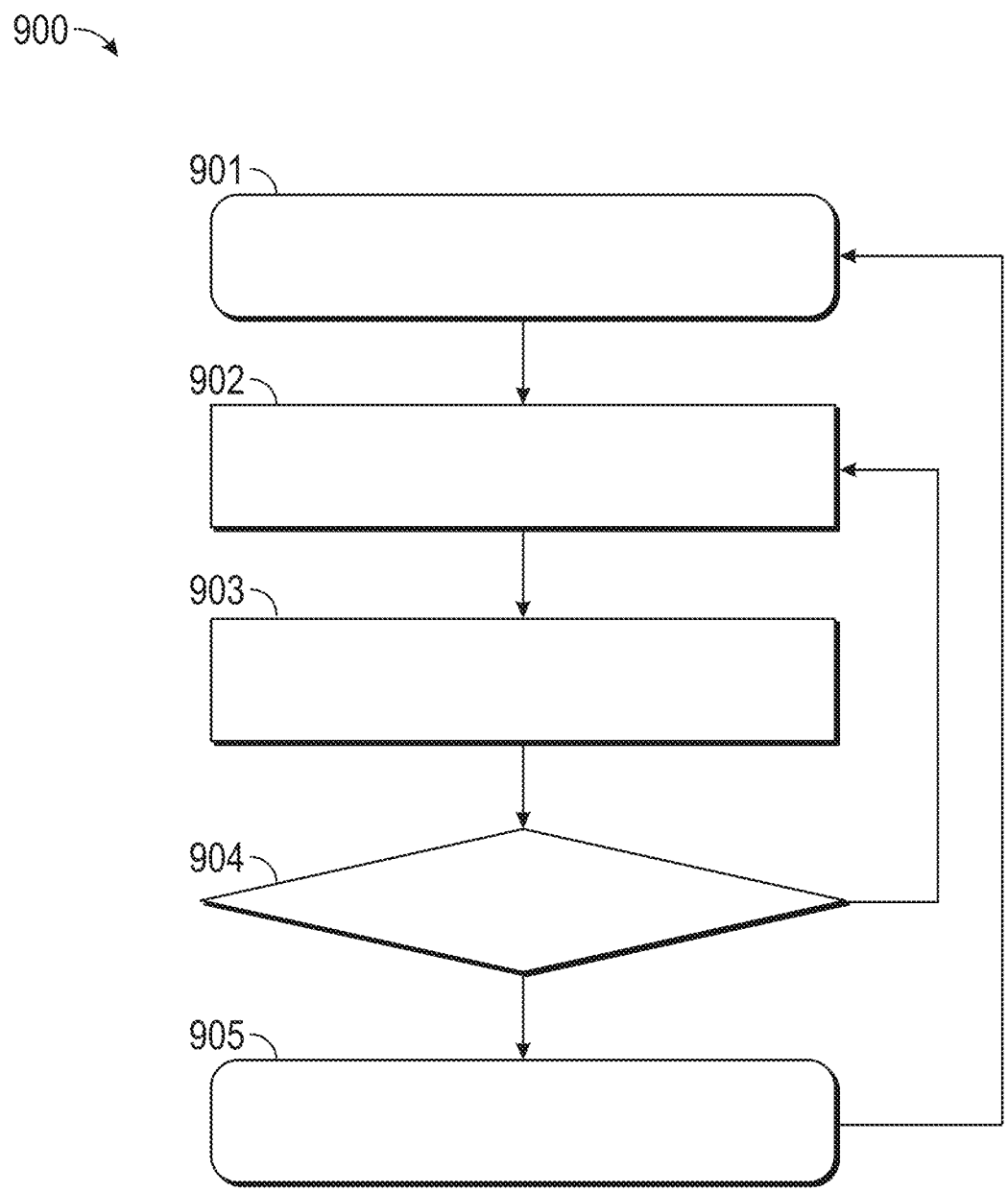
FIG. 9 is an iterative block and flow diagram illustrating a method for network communications using an unequal image frame protection protocol in accordance with one embodiment of the present disclosure.
Figure 10:
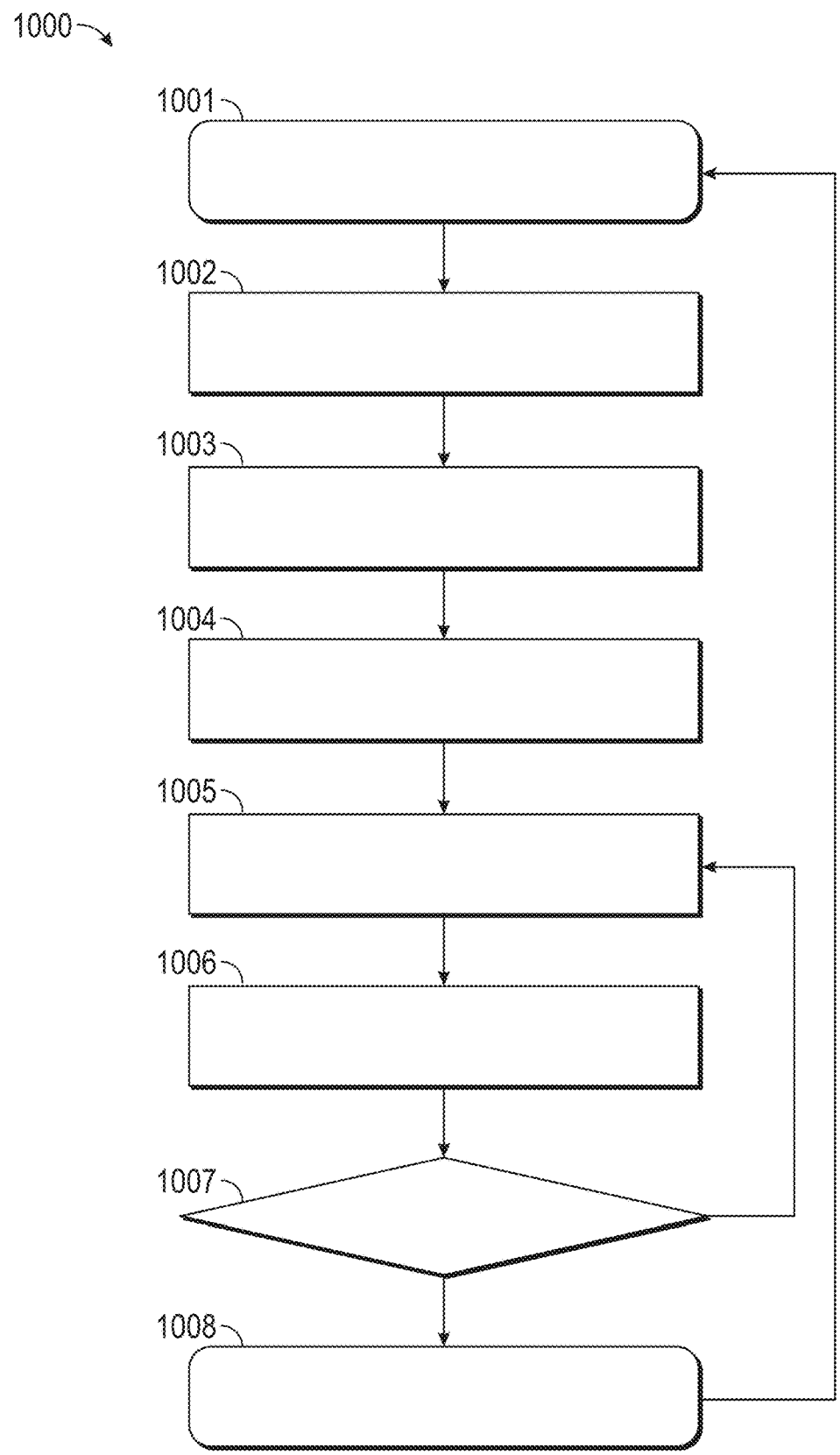
FIG. 10 is an iterative block and flow diagram illustrating a method for network communications using unequal encoded network packet block protection protocol in accordance with one embodiment of the present disclosure.

With common reference now to each of FIGS. 5-7, and with further reference to FIG. 8, greater detail is now provided with regard to the operation of the adaptive selector module 505, which as noted above operates as a function of the unequal protection weighting factor 501, the packet drop rate 502, and the RSSI 503. In particular, FIG. 8 is a circle chart 800 (also commonly referred to as a "pie chart"), which may represent the probability that a particular image frame (FIG. 5), image frame portion (FIG. 6), or encoded network packet block (FIG. 7) will be selected for transmission from the wireless device(s) 71-76 to the vehicle 12. The "share" of the circle chart 800 that each frame/portion/block is accorded in FIG. 8 may be determined on the basis of factors 501-503. For example, the share may be determined on the basis of the following mathematical relationship:

$$f_i = (1-w_i)e + w_i(1-e),$$

wherein $f_i$ is the circle chart 800 share of frame/portion/block i, $w_i$ is the unequal protection weighting factor 501 for such frame/portion/block i, and e is the (non-dimensional) packet drop rate 502 (the packet drop rate 502 may be assumed to be a function of the RSSI 503) at the relevant point in time. As such, at each instance when a frame/portion/block is to be selected for transmission, a particular location 801 along the circle chart may be randomly generated, and the particular location 801 may indicate a selection of one of the shares.

On the basis of the embodiment of FIG. 5, the circle chart 800 sets forth exemplary "shares" that each of the I-frame 511, P-frame 512, and B-frame 513 may occupy (of course, the circle chart 800 could also represent the shares of the blocks 611, 612, 613 representing various image frame portions, or the encoded network packet blocks 314a, 314b, 314c). The randomly generated location 801 along the circle chart 800 is represented by an arrow, and as illustrated, the arrow points to the largest share of circle chart 800, that of I-frame 511, which is statistically the most probable outcome. The selection process shown in FIG. 8 may be repeated for subsequent frames/portions/blocks to be transmitted. Thus, over time, the relative numbers of I-frames 511, P-frames 512, and B-frames 513 (or blocks 611, 612, 612, or encoded network packet blocks 314a, 314b, 314c) transmitted may be proportional to the share that each such frame 511, 512, 513 (or block 611, 612, 612, or encoded network packet block 314a, 314b, 314c) occupies in the circle chart 800. As such, the adaptive selector module 505 operates on the basis of a probabilistic adaptive selection protocol.

Making common reference again to FIGS. 5-6 and 8, FIG. 9 is an iterative block and flow diagram illustrating a method 900 for network communications using unequal image frame (or image frame portion) protection protocols in accordance with one embodiment of the present disclosure. At step 901 of method 900, a group of frames, or portions of image frames, may be considered for network transmission from a wireless device(s) 71-76 to a vehicle 12. At step 902, the adaptive selector module 505, functioning on the basis of an unequal protection weighting 501, a packet drop rate 502, and an RSSI 503, may select an image frame or portion from the group thereof for transmission. Thereafter, at step 903, the selected image frame or portion may be transmitted wirelessly to the vehicle 12. After transmitting, at step 904, it may be determined whether all image frames/portions of the group have been sent. If so, at step 905, a further group of frames, or portions of image frames, may be gathered for consideration, and the method may repeat beginning from step 901. If not, the method 900 may return to step 902 for the selection of a further image frame or portion of the group. This iterative process may be repeated so long as network communications are established between the wireless device(s) 71-76 and the vehicle 12.

Furthermore, making common reference to FIGS. 3-4 and 7-8, FIG. 10 is an iterative block and flow diagram illustrating a method 1000 for network communications using unequal encoded network packet block protection protocols in accordance with one embodiment of the present disclosure. At step 1001 of method 1000, an image frame 211 may be considered for network transmission from a wireless device(s) 71-76 to a vehicle 12. At step 1002, the image frame 211 may be packetized into a plurality (K) of source network packets 312, and the network packets 312 may be segmented into a plurality (S) of source network packet blocks 312a, 312b, 312c, for example as discussed above with regard to the embodiment of FIG. 7. Thereafter, at step 1003, the number of source network packets $K_1$, $K_2$, $K_3$ for each source network packet block 312a, 312b, 312c may be determined. At step 1004, based on the determination of step 1003, a plurality of encoded network packet blocks 314a, 314b, 314c may be generated by the network communications encoder 213, wherein the encoded network packet blocks 314a, 314b, 314c each have a number of encoded network packets $M_1$, $M_2$, $M_3$. After encoding, at step 1005, the adaptive selector module 505, functioning on the basis of an unequal protection weighting 501, a packet drop rate 502, and an RSSI 503, may select an encoded network packet block 701 from the plurality thereof (314a, 314b, 314c) for transmission. Once the encoded network packet block 701 has been selected, the method 1000 may continue with a step 1006 that may include transmitting the selected block 701 wirelessly to the vehicle 12. After transmitting, at step 1007, it may be determined whether all blocks of the plurality (314a, 314b, 314c) have been sent. If so, at step 1008, a further image frame 211 may be gathered for consideration, and the method may repeat beginning from step 1001. If not, the method 1000 may return to step 1005 for the selection of a further block from the plurality thereof (314a, 314b, 314c). This iterative process may be repeated so long as network communications are established between the wireless device(s) 71-76 and the vehicle 12.

Accordingly, the present disclosure has provided methods for operating video communications systems using network packet segmentation and unequal protection protocols. The disclosed methods improve signal reliability/quality while at the same time minimizing time latency. Furthermore, the disclosed methods network packet segmentation and unequal protection protocols to accomplish improved reliability while minimizing time latency. The disclosed embodiments are applicable generally to all wireless image/video communication systems that employ image encoding. Such methods, as described herein, may include a wireless device wirelessly communicating images or video to a vehicle capable of presenting such images or video to an occupant thereof.

While at least one exemplary embodiment of a video communications method has been presented in the foregoing detailed description, it should be appreciated that a vast number of variations exist. It should also be appreciated that the exemplary video communications method or exemplary video communications methods are only examples, and are not intended to limit the scope, applicability, or configuration of the disclosure in any way. Rather, the foregoing detailed description may provide those skilled in the art with a convenient road map for implementing an exemplary embodiment of a video communications method in accordance with the present disclosure. It should be understood that various changes may be made in the function and arrangement of elements described in an exemplary video communications method without departing from the scope of the disclosure as set forth in the appended claims.

What is claimed is:

1. A video communications method comprising:
   segmenting an image frame or an image frame portion into a first source network packet block and a second source network packet block, wherein the first source network packet block comprises a first number of source network packets and the second network packet block comprises a second number of source network packets;
   encoding the first source network packet block to produce a first encoded network packet block and encoding the second source network packet block to produce a second encoded network packet block, wherein the first encoded network packet block comprises a first number of encoded network packets and the second encoded network packet block comprises a second number of encoded network packets, and wherein the first number of encoded network packets is greater than or equal to the first number of source network packets and the second number of encoded network packets is greater than or equal to the second number of source network packets; and
   transmitting the first encoded network packet block and the second encoded network packet block over a wireless network.

2. The method of claim 1, wherein the first number of encoded network packets is greater than the first number of source network packets or the second number of encoded network packets is greater than the second number of source network packets.

3. The method of claim 2, wherein the first number of encoded network packets and the second number of encoded network packets are determined by:
   determining a maximum number of encoded packets ($Q_{max}$) on the basis of an anticipated decoding rate of a receiving device that is configured to receive the transmitted first and second encoded network packet blocks;
   determining a set of first probabilities, wherein each first probability of the set of first probabilities represents the probability that the first encoded network packet block having $M_1$ encoded network packets will be decodable at the receiving device, wherein each first probability of the set of first probabilities represents a different value of $M_1$ less than $Q_{max}$;
   determining a set of second probabilities, wherein each second probability of the set of second probabilities represents the probability that the second encoded network packet block having $M_2$ encoded network packets will be decodable at the receiving device, wherein each second probability of the set of second probabilities represents a different value of $M_2$ less than $Q_{max}$;
   selecting one first probability of the set of first probabilities and selecting one second probability of the set of second probabilities such that the one selected first probability multiplied by the one selected second probability has a value greater than or equal to a value of any first probability of the set of first probabilities multiplied by any second probability of the set of second probabilities; and
   setting the first number of encoded network packets equal to the value $M_1$ represented by the one selected first probability and setting the second number of encoded network packets equal to the value $M_2$ represented by the one selected second probability.

4. The method of claim 2, wherein the first number of encoded network packets and the second number of encoded network packets are determined by:
(1) determining a maximum number of encoded packets ($Q_{max}$) on the basis of an anticipated decoding rate of a receiving device that is configured to receive the transmitted first and second encoded network packet blocks;
(2) determining a first probability that the first encoded network packet block having $M_1$ encoded network packets will be decodable at the receiving device, wherein $M_1$ has a value equal to the first number of source network packets;
(3) determining a second probability that the second encoded network packet block having $M_2$ encoded network packets will be decodable at the receiving device, wherein $M_2$ has a value equal to the second number of source network packets;
(4) determining a third probability that the first encoded network packet block having $M_1+1$ encoded network packets will be decodable at the receiving device and determining a fourth probability that the second encoded network packet block having $M_2+1$ encoded network packets will be decodable at the receiving device;
(5) determining a first incremental gain in probability of the first encoded network packet block on the basis of the third probability divided by the first probability and determining a second incremental gain in probability of the second encoded network packet block on the basis of the fourth probability divided by the second probability;
(6) if the first incremental gain in probability is greater than the second incremental gain in probability, resetting the value of $M_1$ to $M_1+1$, alternatively, if the second incremental gain in probability is greater than the first incremental gain in probability, resetting the value of $M_2$ to $M_2+1$;
repeating steps (2) through (6) until a sum of $M_1$ and $M_2$ equals $Q_{max}$; and
setting the first number of encoded network packets equal to the value $M_1$ when the sum of $M_1$ and $M_2$ equals $Q_{max}$ and setting the second number of encoded network packets equal to the value $M_2$ when the sum of $M_1$ and $M_2$ equals $Q_{max}$.

5. The method of claim 1, further comprising, prior to segmenting the image frame or the image frame portion, selecting the image frame or the image frame portion for transmission over the wireless network.

6. The method of claim 5, wherein selecting the image frame for transmission over the wireless network comprises selecting the image frame from an image frame group that comprises at least one image frame of relatively lower importance and at least one image frame of relatively higher importance, wherein relative importance is defined on the basis of a relative ability of an image frame to be decoded into an image at a receiving device that is configured to receive the transmitted first and second encoded network packet blocks, and wherein selecting the image frame from the image frame group comprises:
assigning a different unequal protection weighting value to each of the at least one image frame of relatively lower importance and the at least one image frame of relatively higher importance;
determining a packet drop rate of encoded network packets transmitted over the wireless network;
determining a relative received signal strength (RSSI) at the receiving device; and
selecting the image frame from the image frame group based on the unequal protection weighting values, the packet drop rate, and the RSSI.

7. The method of claim 6, wherein assigning the different unequal protection weighting values comprises assigning a relatively higher unequal protection weighting value to the at least one image frame of relatively higher importance and assigning a relatively lower unequal protection weighting value to the at least one image frame of relatively lower importance.

8. The method of claim 7, wherein the image frame group comprises an I-frame, a P-frame, and a B-frame, wherein the I-frame is assigned a relatively higher unequal protection weighting value as compared with the P-frame, and wherein the P-frame is assigned a relatively higher unequal protection weighting value as compared with the B-frame.

9. The method of claim 5, wherein selecting the image frame portion for transmission over the wireless network comprises selecting the image frame portion from an image frame portion group that comprises at least one image frame portion comprising an object of relatively lower importance and at least one image frame portion comprising an object of relatively higher importance, wherein relative importance is defined on the basis of a relatedness of an object within an image frame portion to the functioning of an electronic application of a receiving device that is configured to receive the transmitted first and second encoded network packet blocks, and wherein selecting the image frame portion from the image frame portion group comprises:
assigning a different unequal protection weighting value to each of the at least one image frame portion comprising an object of relatively lower importance and the at least one image frame portion comprising an object of relatively higher importance;
determining a packet drop rate of encoded network packets transmitted over the wireless network;
determining a relative received signal strength (RSSI) at the receiving device; and
selecting the image frame portion from the image frame portion group based on the unequal protection weighting values, the packet drop rate, and the RSSI.

10. The method of claim 9, wherein assigning the different unequal protection weighting values comprises assigning a relatively higher unequal protection weighting value to the at least one image frame portion comprising an object of relatively higher importance and assigning a relatively lower unequal protection weighting value to the at least one image frame portion comprising an object of relatively lower importance.

11. The method of claim 10, wherein the image frame portion group comprises an image frame portion comprising a pedestrian object and an image frame portion comprising a bicyclist or vehicle object, wherein the image frame portion comprising the pedestrian object is assigned a relatively higher unequal protection weighting value as compared with the image frame portion comprising the bicyclist or vehicle object.

12. The method of claim 5, wherein selecting the image frame or the image frame portion for transmission over the wireless network is performed using a probabilistic adaptive selection protocol that operates on the basis of an unequal protection weighting value assigned to the image frame or the image frame portion, a packet drop rate of encoded network packets transmitted over the wireless network, and a relative received signal strength (RSSI) at a receiving device that is configured to receive the transmitted first and second encoded network packet blocks.

13. The method of claim 1, wherein transmitting the first encoded network packet block and the second encoded network packet block over the wireless network is performed such that the first encoded network packet block is transmitted prior to the second encoded network packet block or the second encoded network packet block is transmitted prior to the first encoded network packet block, wherein the method further comprises determining an order of transmitting the first and second encoded network packet blocks, wherein determining the order of transmission comprises:

determining a relative importance of the first encoded network packet block and a relative importance of the second encoded network packet block, wherein relative importance is defined on the basis of a relative ability of an encoded network packet block to be decoded into an image at a receiving device that is configured to receive the transmitted first and second encoded network packet blocks;

assigning a different unequal protection weighting value to each of the first encoded network packet block and the second encoded network packet block based on their respective determined relative importance;

determining a packet drop rate of encoded network packets transmitted over the wireless network;

determining a relative received signal strength (RSSI) at the receiving device; and determining the order of transmission of the first and second encoded network packet blocks based on the unequal protection weighting values, the packet drop rate, and the RSSI.

14. The method of claim 13, wherein the first encoded network block comprises a wavelet function data block representing the image frame or the image frame portion at a relatively lower resolution and the second encoded network block comprises a wavelet function data block representing a high-frequency component, and wherein assigning the different unequal protection weighting values comprises assigning a relatively higher unequal protection weighting value to the first encoded network block and assigning a relatively lower unequal protection weighting value to the second encoded network block.

15. A wireless device comprising an electronic processing device and a digital memory device, wherein the digital memory device comprises a resident application comprising computer-readable instructions configured to cause the electronic processing device to:

segment an image frame or an image frame portion into a first source network packet block and a second source network packet block, wherein the first source network packet block comprises a first number of source network packets and the second network packet block comprises a second number of source network packets;

encode the first source network packet block to produce a first encoded network packet block and encode the second source network packet block to produce a second encoded network packet block, wherein the first encoded network packet block comprises a first number of encoded network packets and the second encoded network packet block comprises a second number of encoded network packets, and wherein the first number of encoded network packets is greater than or equal to the first number of source network packets and the second number of encoded network packets is greater than or equal to the second number of source network packets; and transmit the first encoded network packet block and the second encoded network packet block over a wireless network.

16. The wireless device of claim 15, wherein the wireless device is configured as a smart phone, a tablet computer, an image scanner, a music player, a camera, or a drone.

17. The wireless device of claim 15, wherein the computer-readable instructions are further configured to cause the electronic processing device to transmit the first encoded network packet block and the second encoded network packet block over the wireless network to a vehicle, wherein the vehicle comprises a telematics unit and a visual display, wherein the telematics unit is configured to receive the first encoded network packet block and the second encoded network packet block over the wireless network as transmitted by the wireless device, wherein the telematics unit is further configured to decode the first encoded network packet block and the second encoded network packet block to generate a decoded image, and wherein the telematics unit is further configured to cause the visual display to display the decoded image.

* * * * *